(12) United States Patent
Sneed

(10) Patent No.: US 7,546,982 B2
(45) Date of Patent: Jun. 16, 2009

(54) SHUTTLE THERMAL INTEGRITY DETECTION SYSTEM

(76) Inventor: Anthony Sneed, 2058 N. Mills Ave., Claremont, CA (US) 91711-2812

(*) Notice: Subject to any disclaimer, the term of this patent is extended or adjusted under 35 U.S.C. 154(b) by 490 days.

(21) Appl. No.: 10/773,511

(22) Filed: Feb. 5, 2004

(65) Prior Publication Data

US 2004/0238686 A1    Dec. 2, 2004

Related U.S. Application Data

(60) Provisional application No. 60/445,329, filed on Feb. 5, 2003.

(51) Int. Cl.
*B64G 1/58* (2006.01)
(52) U.S. Cl. .................................. 244/159.1; 244/171.7
(58) Field of Classification Search ............. 244/158 R, 244/160, 162, 163, 158 A, 159.3, 159.1, 171.7, 244/158.1; 180/274; 280/735
See application file for complete search history.

(56) References Cited

U.S. PATENT DOCUMENTS 3,826,452 A * 7/1974 Little ......................... 244/160

OTHER PUBLICATIONS http://www.answers.com/space%20shuttle%20columbia%20disaster.*
http://science.ksc.nasa.gov/shuttle/missions/sts-107/mission-sts-107.html.*

* cited by examiner

*Primary Examiner*—Timothy D Collins
(74) *Attorney, Agent, or Firm*—Roberta D. German

(57) ABSTRACT

A detection-grid is disclosed that is part of a vehicle's thermal protection layer, such as that of a space shuttle. A hybrid digital/analog system detects electrical changes in the detection grid caused by mechanical trauma to a vehicle's external surface. The system produces timely and useful display of such events. Furthermore, with redundant verification of such real-time data, the vehicle can detach from other apparatus, such as an external fuel tank or booster rockets, to execute pre-planned glide or descent scenarios maximizing a crew's and vehicle's safe return before proceeding to orbit. The detection-grid ablates off during re-entry of a regular mission.

11 Claims, 3 Drawing Sheets

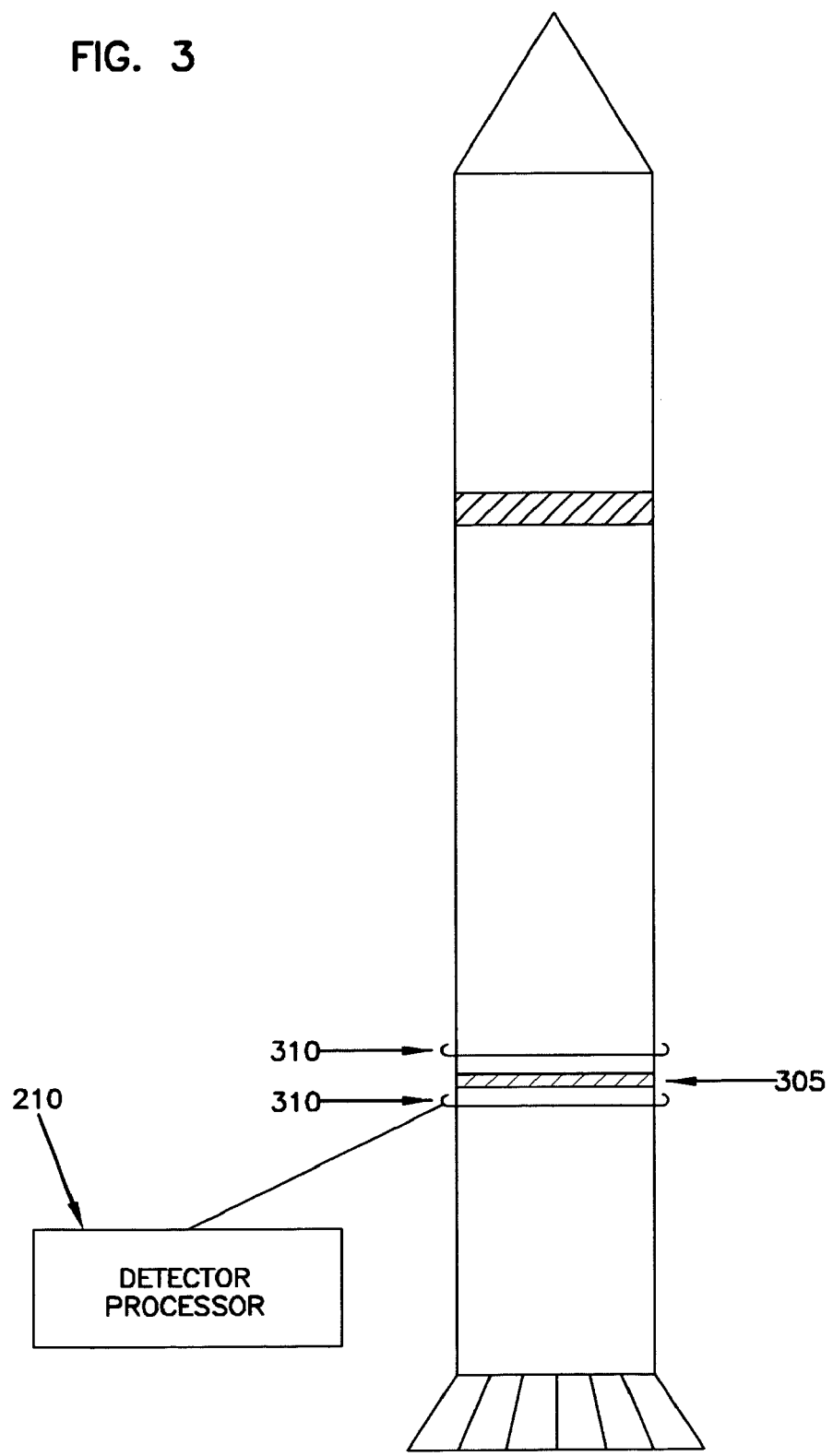

SHUTTLE THERMAL INTEGRITY DETECTION SYSTEM

RELATED APPLICATION DATA

The present application claims the benefit under 35 U.S.C. 119(e) of the priority date of Provisional Application Ser. No. 60/445,329 filed Feb. 5, 2003, which is hereby incorporated by reference.

FIELD OF THE INVENTION

This invention (herein "Invention") generally relates to sensor technology for detecting structural compromise of thermally-sensitive surfaces when exposed to mechanical trauma. Such thermally-sensitive surfaces may be attached to a static structure or a vehicle, including those operating on the ground, in the air, or space, such as space shuttles.

BACKGROUND OF THE INVENTION

An object of the present Invention is to help return a crew operating a vehicle, like a space shuttle, when compromise of the vehicle's thermal-protection surface could lead to catastrophic loss of crew and vehicle. Of the 113 shuttle launches during a 22 year period, the safe return of crews was achieved 98.3% of the time. In the only two exceptions, crews may have safely returned using existing operational capabilities of the shuttle. One of the two vehicles was Challenger, Jan. 28, 1986, whose crew consisted of commander Francis R. Scobee, pilot Michael J. Smith, and astronauts Judith A. Resnik, Ronald E. McNair, Ellison S. Onizuka, Greg B. Jarvis (a fellow member of the technical staff at what was then Hughes Space and Communications Group), and Sharon "Christa" McCaliffe. The other vehicle was Columbia, Feb. 1, 2003, with commander Rick D. Husband, pilot William C. McCool, and astronauts Michael P. Anderson, Kalpana Chawla ("Culp-na Chav-la"), Laurel B. Salton Clark, David M. Brown and Ilan Ramon. This Invention is motivated out of respect for the profound commitment these husbands, wives, fathers, mothers, sons and daughters made in a shared national and international purpose. And it respects the sentiment of the only U.S. president ever to be awarded a patent since the U.S. Constitution was set in motion, regarding those who purposefully give "the last full measure of devotion":

. . . It is rather for us to be here dedicated to the great task remaining before us—that from these honored dead we take increased devotion to that cause for which they gave the last full measure of devotion; that we here highly resolve that these dead shall not have died in vain . . . President Abraham Lincoln, Gettysburg, Nov. 19, 1863

Providence's wisdom, in permitting the U.S. Constitution to exist in its present form, allows a citizen to present a petition, such as this one, regarding useful innovation that may benefit society as a whole. Though powerless while receiving the news reports of Columbia a year ago, Feb. 1, 2003, developing this Invention was the only means available for this writer to check the downward cycle of despair that enveloped himself, his fellow Caltech alums, the nation and the world, as occurred 17 years prior, with Challenger on Jan. 28, 1986.

It is also remembered that certain events precipitated NACA (National Advisory Committee on Aeronautics—the precursor to NASA leading up to the 1950s) to evolve, having been formed to allow the U.S. to achieve and maintain leadership in the aeronautic arts. Yet, as the level of technical excellence and precision was raised to achieve space flight, NACA had to give way to NASA (National Aeronautics and Space Administration), respecting a fundamentally different type of leadership, philosophy and technical commitment to express the nation's new aspirations beyond aerodynamics—research stimulated and advanced by the Wright brothers, Samuel Langley and others in America, as well as internationally, near the turn of the last century.

The NACA/NASA change was and is in complete harmony with the U.S. Constitution:

. . . [T]hat whenever any form of government becomes destructive of these ends, it is the right of the people to alter or to abolish it, and to institute new government, laying its foundation on such principles and organizing its powers in such form, as to them shall seem most likely to effect their safety and happiness.

Prudence, indeed, will dictate that governments long established should not be changed for light and transient causes; and accordingly all experience hath shown, that mankind are more disposed to suffer, while evils are sufferable, than to right themselves by abolishing the forms to which they are accustomed. Congress, Jul. 4, 1776

In other words, the issues embracing the nation's attention, first with Challenger, and later with Columbia, are not specific to just a technological imperative, an institution, or even to this present generation. Because of such issues' visibility to the entire world, they evidence the most sublime meaning of American-based ideals, through a present-day people, and within a shared national purpose which, from the beginning, like so many other American endeavors, has been pregnant with risk and danger, as well as unparalleled achievement and success. The Declaration of Independence acknowledges as much, suggesting that expediency show deference to prudence, while avoiding destructive ritual that may be indifferent to new avenues of safety and happiness for any citizen, regardless of station.

Thus, the matter, at hand, transcends merely the technological arts, exposing the underlying values of those whom, today, must also, by necessity, send others into harm's way.

NACA constituted sacrifice, on an unprecedented scale, to advance the aeronautic arts. And NASA benefited from that knowledge, advancing it far beyond what the NACA charter could encompass. NASA, though formed during the Cold War, inspired a new generation to embrace an impossible challenge—and achieve it.

Now, before us is a new challenge, and it shall again require the boundless energy, enthusiasm, innovation and commitment of a new generation. As NACA provided the foundation for NASA to come into being, so NASA may become the precursor of . . . what?

The California Institute of Technology; the Massachusetts Institute of Technology; Illinois Institute of Technology; Rensselaer Polytechnic Institute; New York Institute of Technology; New England Institute of Technology; Georgia Institute of Technology; Oregon Institute of Technology and universities such as Stanford, Berkeley, Princeton, Chicago, Rice, Rutgers, Dartmouth, Ohio, Michigan, Oregon, Purdue, Colorado, Delaware, Florida, Houston, Louisville, Maryland, Massachusetts, Minnesota, Missouri, Mississippi, New Mexico, North Carolina, Oklahoma, Puerto Rico, Rhode Island, Alabama, Texas, Washington, Wisconsin and Illinois and others represent academic institutions with a profound interest in space and technology to explore it, whether through manned-vehicles or remote probes and robots. It will be from institutions such as these that men and women will come with vision of greater achievements and successes.

NACA was a precursor organization in the evolution that lead to NASA in the 1950s. It is proposed that NISAA continues this progress, in the first decade of the 2000s, as the National Institute for Space and Aeronautic Achievement. NISAA will draw on the best talent from America and the world to advance the cause of shared-human achievement through space exploration, vehicle innovation, sustainable system design, and aerodynamic research. Intrinsic to NISAA's mission is the recognition that all progress, in the discovery and exploratory arts, entail prudent acceptance of risk, uncertainty and danger that the unknown always presents. Yet the confidence to go forward respects the unparalleled sacrifice and accomplishments of those who always answered the call, before, that now compels excellence from a new generation, today.

NISAA goes beyond administering the exploration of space to achieving the highest levels of excellence in the discovery and exploration arts. NISAA benefits from the perspective, wisdom and practical skills NASA helped foster, just as NACA did for NASA prior to the 1950s. The level of investment through NASA was extraordinary compared to anything NACA ever attempted. At the time NASA reflected a national purpose visible to the whole world, affirming American values and the respect for every living soul who is sent into harms way to fulfill such purpose.

NISAA will express these values in new venues, protocols and future endeavors. Its very newness establishes a vibrancy and expectation unlike anything before. It will accept personnel, technology and know-how from its predecessor. However, as NASA did before it, NISAA will define itself in new ways, with new personnel, new innovations, and new achievements that will be wholly its on. Its leadership will be more attuned to the constituent technological institutions, which themselves are among the best the world can offer. With "Achievement" in NISAA's name, it will be a light from and to academe and industry, fulfilling its mission, disciplined by wherewithal inherited to carry the torch forward.

The Invention herein is to help complete the legacy of NASA technology and accomplishments with the space shuttle that are extraordinary in the history of nations. This Invention is to help ensure that NASA is honored for all that it has done for America and the world through the lives of those who served it, whether on earth or above it. And as NISAA may come into being through a new birth of commitment, let it always be remembered that such birth, when and where it is permitted to be, has been through the lives of those who gave the "last full measure of devotion."

Thus, this Invention is a declaration of honor and gratitude to NASA, its current administrator, its past administrators, and its talented explorers, scientists, engineers, technicians, management, administrative, operations and support staffs who have carried the torch through the unknown, and lighted the way for an unlimited future that awaits a new generation, with courage and dedication to embrace and advance what NACA and NASA have set before mankind. This will not be achieved within the first 100 days of NISAA, nor perhaps the first thousand days, nor within the present generation. There may yet be unforeseen set backs. But with the steady confidence and progress NACA and NASA established, let us begin.

SUMMARY OF INVENTION

The Invention herein detects anomalies at critical phases of a shuttle's operation, especially between launch and attaining orbit. In the case of Challenger, the Invention may have helped make the decision to detach the solid rocket boosters before their catastrophic failure. Well-planned scenarios for crew and vehicle recovery are extant with timely information to make such a decision. In the case of Columbia, multiple abort options were available between launch and attaining orbit if thermal compromise was detectable in real-time. In both cases, real-time, telemetry information on thermal integrity regarding booster section seams and heat-sensitive surfaces on the shuttle itself may have helped permit the safe return of all 113 crews. It should be noted that in so complex a research vehicle, such as the shuttle, its 98.3% safe-return of crews speaks volumes to NASA's clear intentions regarding the well being of every astronaut.

Space shuttles, as research vehicles, using ceramic or brittle thermal protection technology on their outer surfaces, are vulnerable to catastrophic failure. The Invention herein detects compromise of such a thermal protection layer, whether ceramic tiles or other thermally protective material, within the critical window a shuttle may safely return to earth. It allows such determination before a shuttle goes into orbit, where compromise of thermal protection on the outer surface of a vehicle can lead to catastrophic failure, such as during re-entry. Furthermore, it considers the thermal integrity of "structural seams" and component parts of a shuttle's booster rockets, particularly such seams that when compromised by heat or fuel leakage of any type, could lead to the loss of such vehicles. Additionally, all such detected data are injected into a telemetry stream for real-time decisions that may aid the safe-return of crews operating such vehicles.

Finally, since any decision regarding such thermal integrity may affect some $500 million to launch and operate such a vehicle, or some $5 billion to reproduce a new vehicle, redundant verification of thermal layer integrity on such a vehicle helps reduce to acceptable levels, or prevent, false positives or negatives during operation and or flight.

If in fact there is no compromise of the integrity of the thermal layer that protects a shuttle or other vehicle or surface, a sensor grid used to verify thermal integrity ablates off during the course of re-entry.

BRIEF DESCRIPTION OF THE DRAWINGS

FIG. 3. shows a rocket having continuity loops attached above and below the seams of the sections of the rocket.

DETAILED DESCRIPTION OF INVENTION

Figure 1:
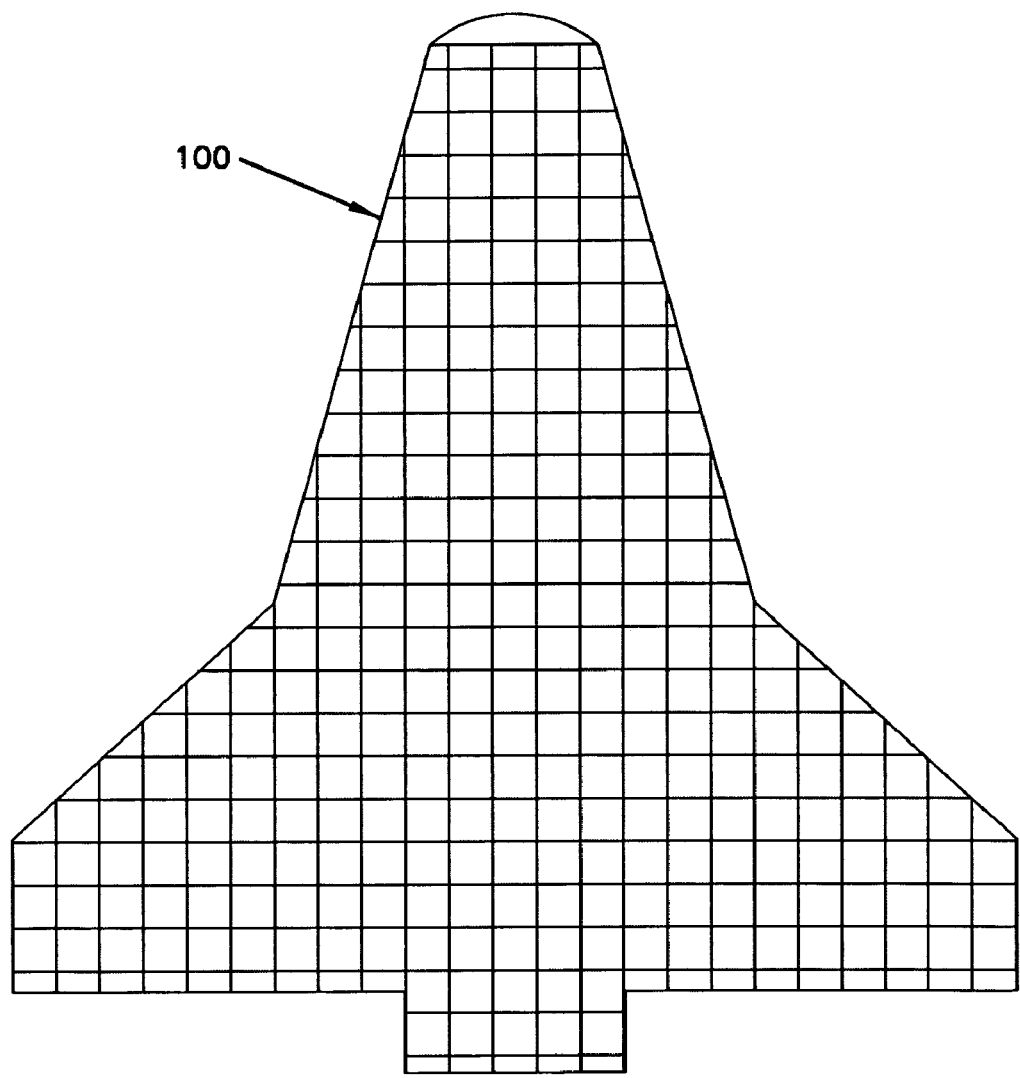
FIG. 1. shows the affected surface area of a vehicle and the sensor grid 100 that spans it. In this implementation, a horizontal/vertical grid is indicated, though other geometries can be accommodated depending on the shape of a vehicle, or the areas of compromise to be detected.
Figure 2:
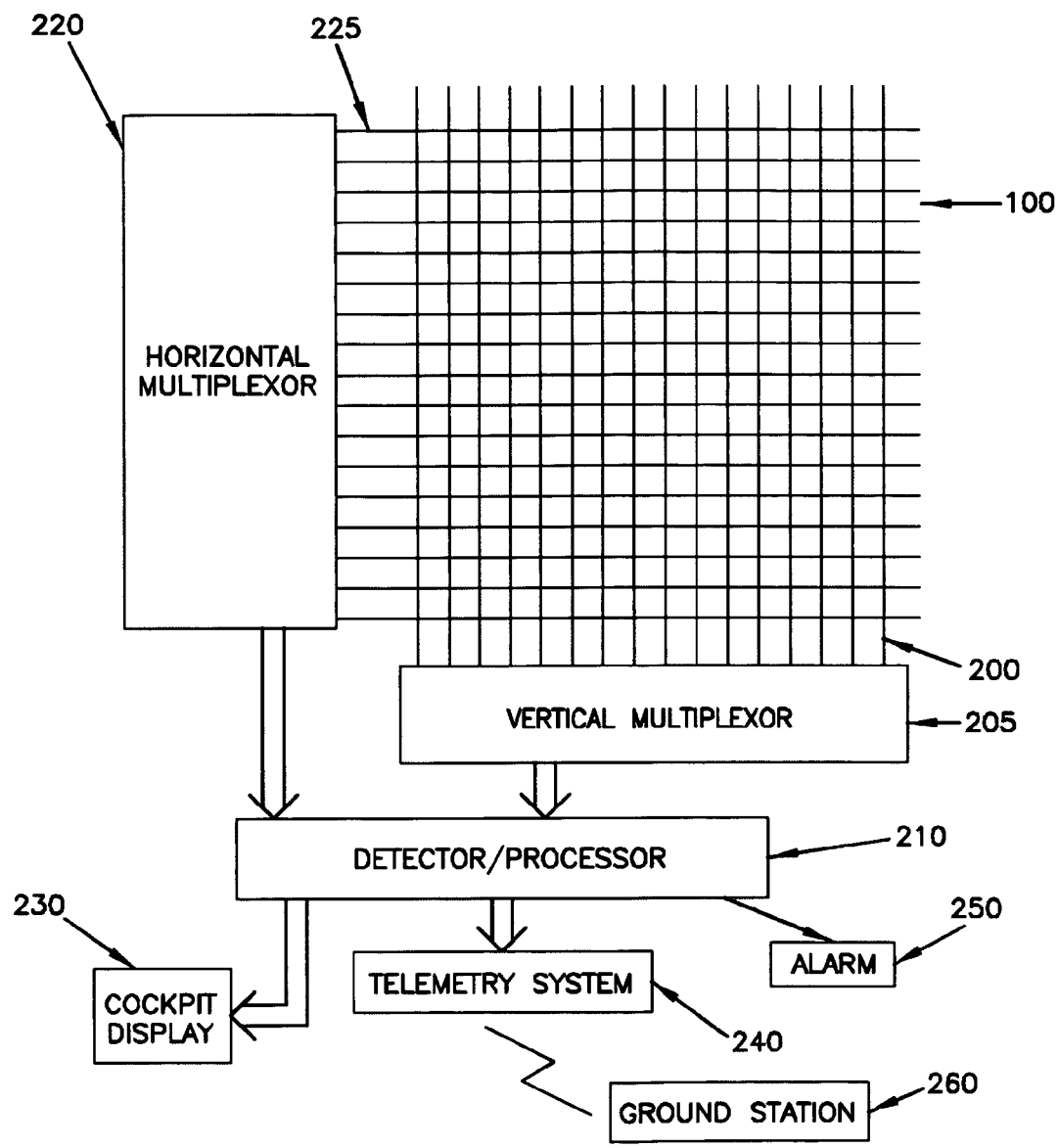
FIG. 2. shows vertical grid elements 200 feeding into vertical multiplexor 205 that samples each grid element at an appropriate rate. Horizontal grid elements 225 feed into horizontal multiplexor 220. Both 205 and 220 feed into detector/processor 210 which converts the signals from the grid elements to produce digital values defining an area or areas of compromise.

The present invention provides a 100 sensor grid on the surface area of a vehicle FIG. 1. The preferred embodiment is described of a system and attached apparatus for detecting thermal integrity of a protective layer on a vehicle's surface, such as a shuttle, during its operation. FIG. 2. shows the vertical grid elements 200 that attach to the surface areas of interest through either mechanical or adhesive technology, or are suspended above the areas of interest with suspension points at intervals across the surface areas of interest. The Invention detects compromise of all or part of the grid elements. The option of multiple contact points and feeds along any grid element is not excluded, which permits other grid elements to continue operating around a compromised area, allowing horizontal multiplexor 220 and vertical multiplexor 205 to receive redundant data, or to receive localized data independent of other grid areas. Connective terminals or fasteners or sockets allow grid elements to attach to vertical multiplexor 205. The same is true also for horizontal grid elements 225 and horizontal multiplexor 220.

Both vertical multiplexor 205 and horizontal multiplexor 220 feed digitized values to detector/processor 210. Detector/processor 210 then produces further refined digital values that can be used to plot thermal integrity in a cockpit display 230 or for transfer to telemetry system 240 for down-link to ground station 260. Ground station 260 has regular processing systems for displaying all telemetry from a vehicle. Additionally, such display is available to the vehicle's crew in whole or in part.

When an external event or events compromise the detection grid, data values produced from detector/processor 210 allow rapid assessment of the area of compromise. Multiple levels of detection grids may be installed on the outside, within and/or beneath the vehicle's thermal protection layer to determine the depth of compromise, if such refinement is needed. Alarm 250 can automatically sound for extraordinary compromise, processor 210 sensing grid trauma that precedes events indicative of potential vehicle failure in different phases of its operation.

The detection grid may also be comprised of wire-strips, containing one or more wires in very close proximity. These may also be twisted-pair or topologically similar configurations to reduce noise. An alternative implementation is to use conductive paint to form all or part of the detection grid. Additionally, transmission delays along grid elements could be detected to indicate compromise, when different grid transmission times are compared. To aid in such detection, passive or active components (such as resistors, transistors, diodes) may be at the intersection of grid elements, and attach to different grid elements that physically (but not electrically) intersect. Passive or active components that do create electrical connection between different, intersecting grid elements are selected such that the electrical characteristics of the grid are sensitive to even a small subset of such elements, or an individual element, being compromised by external trauma determined to be indicative of potential vehicle failure.

Alternatively, fiber-optic, or other light sensitive grid elements, may be used to detect either breaks or attenuation of light transmittance, indicating compromise as determined from definable limits in detector/processor 210, telemetry system 240, cockpit display 230 or ground station 260. If needed, the entire grid could be fiber-optic, or a subpart of the grid in hybrid configuration, as noise and other electrical characteristics warrant.

Since the Invention detects in real-time, the decision can be made to proceed with a mission or to terminate the mission during easily recoverable phases, such as prior to reaching orbit.

The sensing gird and components are selected based on weight and the ability to readily break when exposed to definable mechanical trauma, or to provide detectable changes when exposed to such trauma. Additionally, the sensor and other components may be selected to allow ready ablation in the final phase of a successful mission.

As needed, a redundant grid or grids may co-exist with a primary grid, other grids offset vertically or horizontally or laterally from one another, since the information from the Invention could determine if a multi-million-dollar mission continues or is terminated.

The integrity of the system is tested prior to launch of a vehicle. Once confirmed, launch proceeds and the system operates continually, including while in orbit to detect any events during orbital operations: space debris, stray tools or material from the vehicle, or mechanical accidents during extra vehicular activity that might compromise vehicle thermal integrity.

The digital components are kept to a minimum to meet weight requirements, perhaps allowing the system, independent of grid and connecting elements, to weigh about a kilogram, if possible, at an off-the-shelf-cost of actual circuit components of about $200 per unit. To meet military specifications, the weight might increase as would the price of a unit depending on grid technology and detection sophistication (propagation delays and multi-compromise detection).

An alternative implementation is for each grid element to detect the absence of a thermal element on the surface of a vehicle (such as a tile). In this case, the grid and its detection elements could be exclusively beneath the thermal protection layer and the elements thereof, requiring little if any reinstallation between missions. The grid detection elements could be one-to-one for the thermal elements (such as tiles) or one-to-many depending on weight and the geometries to accommodate individual thermal surface elements per grid element or multiple thermal surface elements per grid element.

An additional embodiment is to include 310 "continuity loops" above and below the 305 seams of the sections of solid rocket boosters attached to a shuttle FIG. 3. Such wire, fiber optic, conducting paint, or other lines of material would be on the circumference of the booster cylinders (or other areas of the vehicle) above and below sections that are sealed together. Each 310 loop could be within protective insulation or covering. The 310 continuity loops may be redundant and also use a twisted pair topology to reduce noise. The material and insulation used to make the 310 "continuity loops" would melt through when a localized temperature on any part of a loop is elevated beyond a pre-determined threshold.

The wires of the 310 continuity loop on the boosters or other thermally sensitive areas would feed into detector/processor 210, for display or down link with other horizontal grid elements 225 and vertical grid elements 200. This would allow a relatively complete, real-time "thermal integrity" check of all relevant vehicle surfaces and seams or other thermally sensitive areas or components. Should the integrity of any of these components be comprised, both the ground station and on-board personnel would have timely information to make critical decisions after launch and before proceeding to orbit, as well as while in orbit and before initiating re-entry. This, for example, allows on-board or ground personnel to initiate a safe-glide return alternative, after launch, and before a vehicle goes into orbit, or to choose alternatives to re-entry if any vehicle thermal-surface integrity compromise is detected before dropping out of orbit.

Finally, in the event of thermal protective layer form that may produce cavities of empty space beneath the protective layer's surface, 270 pressure sensing devices would act as a redundant detectors of compromise. That is, in addition to the protection-grid and telemetry resulting from it, pressure sensors within hallow cavities would produce separate telemetry of pressure changes. An example of this would be the hollow area between re-enforced carbon-carbon elements on the leading edge of a shuttle's wing, and the flat forward edge of the wing itself. As such, if there is a precipitous change of pressure within such a cavity and trauma to the detection grid, then the two independent telemetry sources would indicate crew and vehicle safety is compromised or may soon be compromised during continued operation of the vehicle.

What is claimed is:

1. A system for detecting damage to a thermal protection surface of a spacecraft, the system comprising:
   a). A grid mounted with the thermal protection surface;
   b). An apparatus connected with the grid for detecting the change in the property of the grid; and
   c). An analyzer connected with the apparatus for receiving and analyzing the change in the property of the grid.

2. The system of claim 1, wherein the grid comprises a material that ablates upon re-entry of the spacecraft into the earth's atmosphere.

3. The system of claim 1, wherein the grid mounted with the thermal protection surface is mounted on the exterior of the thermal protection surface, embedded within the thermal protection surface, or mounted beneath the thermal protection surface, or any combination of these positions.

4. The system of claim 1, wherein the spacecraft is a space shuttle.

5. The system of claim 1, wherein the apparatus for detecting the change in property of the grid is a multiplexer.

6. The system of claim 1, wherein the analyzer is a detector or processor.

7. The system of claim 1, further comprising a cockpit display that receives the detected change in the property of the grid from the apparatus that detects the change in property of the grid.

8. The system of claim 1, further comprising a telemetry system that receives the detected change in the property of the grid from the apparatus that detects the change in property of the grid.

9. The system of claim 1, wherein the grid mounted with the thermal protection surface is mounted on a seal that fastens parts of the spacecraft.

10. The system of claim 1, wherein the grid comprises a material that undergoes a detectable change in a property of the grid when the thermal protection surface is damaged.

11. The system of claim 10, wherein the material is metallic wire, optical fiber, conductive paint, or any combination of these materials.

* * * * *